US012776198B2

United States Patent

(12) United States Patent
Kamalanathan et al.

(10) Patent No.: US 12,776,198 B2
(45) Date of Patent: Oct. 27, 2026

(54) RANKING ANOMALOUS SENSOR BY CRITICALITY USING CAUSAL INFERENCE TECHNIQUES

(71) Applicant: Applied Materials, Inc., Santa Clara, CA (US)

(72) Inventors: Geethanzali Kamalanathan, Milpitas, CA (US); Sidharth Bhatia, Santa Cruz, CA (US); Murali Sridhar, Chennai (IN); Vijay Anand, Bangalore (IN); Bala Shyamala Balaji, Bengaluru (IN); Ananthan Raghunathan, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 45 days.

(21) Appl. No.: 18/972,686

(22) Filed: Dec. 6, 2024

(65) Prior Publication Data

US 2026/0162513 A1 Jun. 11, 2026

(51) Int. Cl.

| | |
|---|---|
| ***G06F 18/2134*** | (2023.01) |
| ***G06F 18/20*** | (2023.01) |
| ***G08B 21/18*** | (2006.01) |
| ***H04L 67/12*** | (2022.01) |

(52) U.S. Cl.

CPC ..... *G08B 21/182* (2013.01); *G06F 18/21342* (2023.01); *G06F 18/295* (2023.01); *H04L 67/12* (2013.01)

(58) Field of Classification Search

CPC ............. G08B 21/182; G06F 18/21342; G06F 18/295; H04L 67/12

USPC .......................................................... 340/540

See application file for complete search history.

(56) References Cited

U.S. PATENT DOCUMENTS

| | | | | |
|---|---|---|---|---|
| 7,764,702 | B2 * | 7/2010 | Yang | H04L 41/0873 370/231 |
| 10,997,244 | B2 * | 5/2021 | Russell | G06F 16/27 |
| 11,580,842 | B1 * | 2/2023 | Hauser | G08B 21/182 |
| 11,954,568 | B2 * | 4/2024 | Doddala | G06N 20/00 |
| 2015/0178101 | A1 | 6/2015 | Krishnaswamy et al. | |
| 2017/0261971 | A1 | 9/2017 | Schulze et al. | |
| 2018/0181749 | A1 | 6/2018 | Kolacinski et al. | |
| 2020/0112577 | A1 | 4/2020 | Han et al. | |

(Continued)

OTHER PUBLICATIONS

International Search Report and Written Opinion from PCT/US2025/048723 dated Jan. 27, 2026, 8 pgs.

*Primary Examiner* — Naomi J Small

(74) *Attorney, Agent, or Firm* — Schwabe, Williamson & Wyatt, P.C.

(57) ABSTRACT

Embodiments described herein relate to a method that includes generating weighted causal graph for a tool through with an informational theory probabilistic approach and/or a statistical approach. In an embodiment, the method further includes generating a criticality score for each of a plurality of nodes within the weighted causal graph, and generating a weighted anomaly score for each of the plurality of nodes. In an embodiment, the weighted anomaly score is calculated based on the criticality score of one or more nodes within a causal group for a given node and a fault metric of the given node. In an embodiment, the method further includes ranking the plurality of nodes based on the weighted anomaly score of each of the plurality of nodes.

20 Claims, 5 Drawing Sheets

(56) References Cited

U.S. PATENT DOCUMENTS

| | | | |
|---|---|---|---|
| 2021/0103768 | A1 | 4/2021 | Niculescu-Mizil et al. |
| 2022/0414072 | A1* | 12/2022 | Tandon ................. G06F 16/215 |

* cited by examiner

RANKING ANOMALOUS SENSOR BY CRITICALITY USING CAUSAL INFERENCE TECHNIQUES

BACKGROUND

1) Field

Embodiments of the present disclosure pertain to the field of ranking sensor alarms by criticality through the use of causal inference techniques in semiconductor manufacturing environments.

2) Description of Related Art

Fault detection algorithms identify anomalous sensors and raise alarms if the sensor exhibits a statistically significant trend that deviates from the expected behavior. However, not all sensors within a system are critical for a given process. In the case of semiconductor manufacturing, there may be hundreds of sensors that are monitored. Accordingly, the ability to rank anomalous sensors based on how critical the sensor is to a given process is desired in order to prevent alarm fatigue. Additionally, prioritizing sensor alarms can be used to prioritize interventions in order to improve the overall health of the system being monitored.

Current solutions for defining relationships between variables in a manufacturing system are correlation-based. This may result in any weights associated with the relationships being unstable and/or inaccurate.

SUMMARY

Embodiments described herein relate to a method that includes generating weighted causal graph for a tool through with an informational theory probabilistic approach and/or a statistical approach. In an embodiment, the method further includes generating a criticality score for each of a plurality of nodes within the weighted causal graph, and generating a weighted anomaly score for each of the plurality of nodes. In an embodiment, the weighted anomaly score is calculated based on the criticality score of one or more nodes within a causal group for a given node and a fault metric of the given node. In an embodiment, the method further includes ranking the plurality of nodes based on the weighted anomaly score of each of the plurality of nodes.

Embodiments described herein relate to a method that includes obtaining criticality scores of a plurality of nodes within a causal graph, where the causal graph describes causal relationships between the plurality of nodes for a processing tool. In an embodiment, the method further includes monitoring the plurality of nodes as the processing tool is operated, and triggering an alarm when an individual one of the plurality of nodes has a weighted anomaly score that exceeds a threshold value associated with the individual one of the plurality of nodes. In an embodiment, the weighted anomaly score is calculated based on a combination of an associated criticality score and a fault severity. In an embodiment, the method further includes ranking a plurality of triggered alarms based on the weighted anomaly scores of the plurality of nodes.

Embodiments described herein relate to a method that includes detecting an anomalous node in a causal graph of a tool at a first time, and performing a root cause analysis of the anomalous node to find a root cause node associated with the anomalous node. In an embodiment, the method further includes determining if the root cause node was an anomalous root cause node at a second time that is before the first time, and modifying a threshold of the anomalous root cause node and/or increasing a criticality score of the anomalous root cause node.

DETAILED DESCRIPTION

Figure 1:
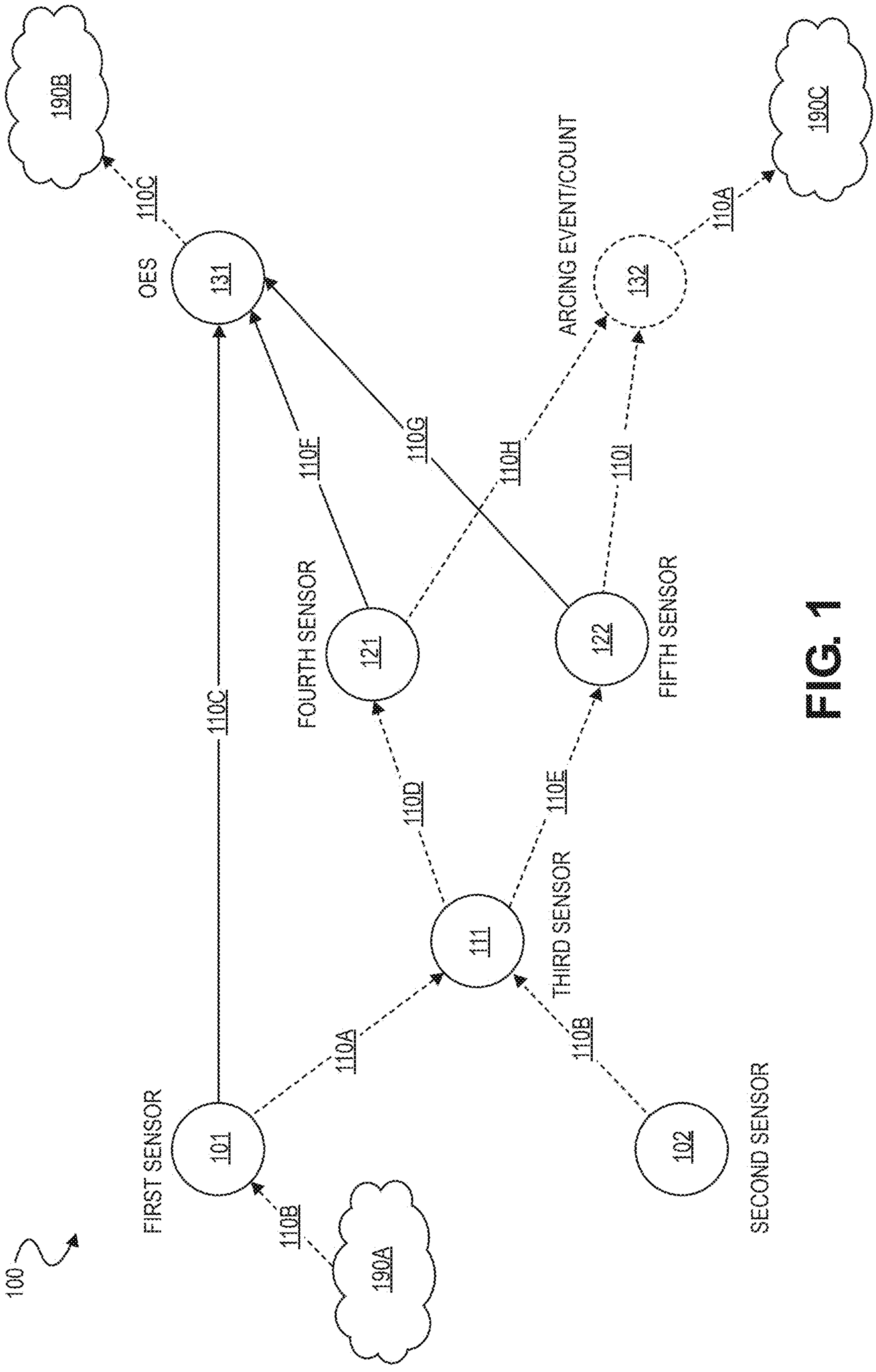
FIG. 1 is a causal graph of a plurality of causally related nodes of a semiconductor processing tool, in accordance with an embodiment.

Described herein are systems and methods for ranking sensor alarms by criticality through the use of causal inference techniques in semiconductor manufacturing environments. In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Furthermore, it is to be understood that the various embodiments shown in the accompanying drawings are illustrative representations and are not necessarily drawn to scale.

Various embodiments or aspects of the disclosure are described herein. In some implementations, the different embodiments are practiced separately. However, embodiments are not limited to embodiments being practiced in isolation. For example, two or more different embodiments can be combined together in order to be practiced as a single device, process, structure, or the like. The entirety of various embodiments can be combined together in some instances. In other instances, portions of a first embodiment can be combined with portions of one or more different embodiments. For example, a portion of a first embodiment can be combined with a portion of a second embodiment, or a portion of a first embodiment can be combined with a portion of a second embodiment and a portion of a third embodiment.

The embodiments illustrated and discussed in relation to the figures included herein are provided for the purpose of explaining some of the basic principles of the disclosure. However, the scope of this disclosure covers all related, potential, and/or possible, embodiments, even those differing from the idealized and/or illustrative examples presented. This disclosure covers even those embodiments which incorporate and/or utilize modern, future, and/or as of the time of this writing unknown, components, devices, systems, etc., as replacements for the functionally equivalent, analogous, and/or similar, components, devices, systems, etc., used in the embodiments illustrated and/or discussed herein for the purpose of explanation, illustration, and example.

As noted above, semiconductor manufacturing tools and/or systems (e.g., deposition tools, etching tools, treatment tools, tools that utilize a plasma, and/or the like) may include many sensors (e.g., hundreds of sensors in some instances). Such tools may use fault detection and classification (FDC) algorithms to monitor sensor data. The FDC algorithms may be used to identify anomalous sensors. Due to the large number of sensors, a large numbers of anomalous sensors (i.e., a sensor with readings that exhibit a statistically significant trend that deviates from the expected behavior) may be present at any given time. The presence of an anomalous sensor reading may trigger an alarm that is provided to the operator of the tool or system. When many alarms are triggered, the operator may experience alarm fatigue. That is, the overwhelming number of alarms may result in some of the alarms being ignored, which can lead to the improper prioritization of corrective actions. Alarm fatigue may also result in the operator missing critical sensor alarms that negatively impact tool performance. This can lead to poor yields, which diminishes the value of the tool.

In order to avoid alarm fatigue it may be desirable to rank the alarms so that the operator can prioritize intervention processes (e.g., diagnostics, cleaning, maintenance, and/or the like). However, since existing ranking processes are correlation-based, the relationships determined may not accurately and/or reliably match the true relationships between components, processing conditions, and/or the like. This is because the relationships that are present in the tool or system are largely causal-based. Sensitivity analysis with output data (e.g., on-wafer data) may be performed to determine the criticality of sensors more accurately. However, such processes are time-consuming and expensive. They also require systematic experiment design in addition to the metrology needed to collect the on-wafer data for each application.

Accordingly, embodiments disclosed herein provide processes to calculate node criticality (e.g., where each node may be a sensor) using causal inference methods. This allows for the relationships between sensors within a system to be based on causation rather than correlation. For example, the criticality of each node may be calculated using the weight of a causal relationship. This has been proven to be more stable and/or accurate than correlation-based criticality measurements. In some embodiments, causation-based criticality measurements may be obtained through the use of a Markov blanket approach or a causal path tracing approach.

Once the node criticality is determined for anomalous sensors, the anomalous sensors may be ranked. For example, a display visible to the operator of the tool or system may display the anomalous sensors from highest to lowest. A visualization or visual indicator of the ranking for the anomalous sensors may also be provided (e.g., red for high rankings to indicate a high priority issue, yellow for middle rankings to indicate an issue that is potentially problematic, or green for low rankings to indicate a low priority issue). The visual display may allow the operator to prioritize diagnostics, maintenance and/or the like in order to address the high priority issues first. When sensors are ordered by criticality, the proper corrective actions (e.g., tool maintenance, sensor replacement, component replacement, and/or the like) can then be taken in order to bring these critical sensors readings back into an expected range. As such, tool up-time can be improved. This allows for better tool utilization since the tool may be taken offline less frequently for diagnostics and/or planned maintenance. Further, yields may be improved since issues are spotted and corrected faster. Accordingly, the value of the tool may be significantly improved compared to existing solutions.

In addition to improving alarm fatigue and improving tool utilization, the ranking process may allow for the discovery of a root cause of an anomalous sensor to further optimize tool performance, tool monitoring, and/or the like. For example, causal path tracing may be used for root cause analysis. During the causal path tracing, an upstream node with a low criticality ranking may be identified as being anomalous at some time prior to a downstream node with a high criticality ranking that has an anomalous reading. In such an embodiment, a causal association between the upstream node and the downstream node may indicate that the prior anomalous behavior of the upstream node resulted in the subsequent anomalous behavior of the downstream node. Accordingly, the criticality ranking of the upstream node may be increased in the future since the upstream node may serve as an early warning that the critical downstream node is on the verge of being anomalous.

In some embodiments, the calculation of causal-based criticality values may begin with the generation of a directed acyclic graph (DAG). A DAG is used to map causal relationships between nodes (e.g., sensors) in a system, such as a semiconductor processing tool or system. FIG. 1 is an example of a DAG that is generated through one or more machine learning processes for a semiconductor processing tool, according to some embodiments.

In some embodiments, causality data may be represented visually using a causal graph such as a DAG. In some embodiments, arrows (e.g., edges 110A-I) indicate the direction of causality between nodes (e.g., sensors in a manufacturing system/subsystem). In some embodiments, nodes in a causal graph represent the variables of the manufacturing system (e.g., the sensors, values measured by sensors, sensor data, etc.), and the edges (represented with arrows) between nodes represent the causal relationships between the nodes (e.g., sensors of a manufacturing system/subsystem, sensor data, sensor values, etc.). In some embodiments, the direction of the arrow indicates the direction of causality, with the tail of the arrow indicating the cause and the head of the arrow indicating the effect. In some embodiments, a DAG may be connected to other DAGs showing causal link between nodes of separate systems or subsystems.

In some embodiments, a causal strength index matrix and a causal graph (e.g., DAG) are complementary representations of causality data, where the causal matrix provides a quantitative measure of causality strength (e.g., weights of directed edges of a DAG) and the causal graph provides a visual representation of the causal relationships between variables.

Informational theory probabilistic methods are statistical methods used to determine whether there is a cause-and-effect relationship between two variables (e.g., Granger causality). In some embodiments, determining a structural graph proposal can be accomplished by using informational theory probabilistic methods such as Granger causality, transfer entropy measures, cross-entropy measures, partial directed coherence, linear and non-linear conditional independence tests, and/or the like.

In some embodiments, determining a structural graph proposal can be accomplished by extending causality tests over all sensors (e.g., nodes) of the system. Causality tests may also be used on the sensor data to generate a causal strength index matrix. In some embodiments, the causal strength index matrix may be based on at least one of, Granger causality, transfer entropy measures, cross-entropy measures, causality tests, or partial directed coherence, or linear and non-linear conditional independence tests. A causal strength index matrix provides a quantitative measure of the strength of the causal relationships between different variables, sensors, or sensor values measured in the system. In some embodiments, degree centrality is a measure used to evaluate the importance of a sensor (e.g., node) in the causal strength index matrix. In some embodiments, the number of connections that a node (e.g., sensors) has with other nodes in the matrix determines the degree centrality. Nodes with a high degree centrality may be considered more important and influential in a system. In some embodiments, a causal strength index matrix can be generated by considering degree centrality and transfer entropy measures for a set of data (e.g., sensor data).

In some embodiments, if no data (e.g., sensor data) is available to determine weights, a count of how many nodes (e.g., sensors) that are connected to another node (e.g., sensor) may be used to determine sensor criticality. In some embodiments, the sum of the weights of all the causal edges (edges indicating the nodes effect on other nodes) of the node may be used to determine sensor criticality.

In some embodiments a DAG proposal (e.g., generated using techniques described above) may be validated and refined by subject matter expert (e.g., a user). For example, a causality test may have indicated a bi-directional edge between two nodes A and B. In some embodiments, a subject matter expert might determine that the edge is not bi-directional, and the causality flows only from A to B. In some embodiments, a DAG or DAG proposal that is refined by user input (e.g., by subject matter expert) may be referred to as a causal knowledge DAG.

In some embodiments, DAG 100 represents a wafer manufacturing system or subsystem. In some embodiments, DAG 100 includes nodes representing sensors within the wafer manufacturing system or subsystem. For example, DAG 100 may represent a processing chamber. In some embodiments, node 101 represents a first sensor, node 102 represents a second sensor, node 111 represents a third sensor, node 121 represents a fourth sensor, node 122 represents a fifth sensor, node 131 may represent an OES tool, and node 132 may represent an arcing sensor. In some embodiments, each node has a causal relationship with other nodes in the manufacturing system as represented by arrows 110A-I. In some embodiments, the direction of the arrow indicates the direction of causality, with the tail of the arrow indicating the cause and the head of the arrow indicating the effect.

In some embodiments, DAG 100 may represent a manufacturing subsystem. DAG 100 may show causal connections within the manufacturing subsystem as well as causal connections with other subsystems. For example, subsystems 190A-C all have causal connections to the subsystem represented by DAG 100. In some embodiments, subsystem 190A may be causally related to first sensor 101. For example, changes in a node (sensor) in subsystem 190A may cause changes to first sensor 101. In some examples, nodes within DAG 100 may cause changes to other subsystems. For example, OES node 131 may be causally related to subsystem 190B and changes to OES nodes 131 may cause changes to a node (sensor) in 190B. In another example, arcing/event counter 132 may be causally related to subsystem 190C and changes to arcing/event counter 132 may cause changes to a node (sensor) in 190B.

Sensors in a manufacturing system may collect data (e.g., sensor data) that is anomalous (e.g., data and/or measurements values that are outside the expected or normal range for a particular parameter). For example, a sensor collecting anomalous data or values, may indicate a problem or issue with the manufacturing process. For example, a temperature sensor may detect a sudden increase in temperature inconsistent with the normal behavior of the manufacturing process. Such an anomalous behavior from an anomalous sensor may indicate, for example, a miscalibrated sensor, a malfunctioning pressure element, a blocked coolant flow, or some other issue that is affecting the temperature control.

In some embodiments, a causal graph (e.g., DAG 100) allows the root cause and/or root causes of an anomalous sensor to be traced. For example, node 132 may begin to collect anomalous data (e.g., node 132 is an anomalous sensor). In some embodiments, the causes of anomalous sensor 132 may be traced using the causal relationships between node 132 and other nodes in the system. For example, dotted arrows 110A, 110B, 110D, 110E, 110H, and 110I show the causal path of node 132. It should be noted that more than one root cause may exist for an anomalous sensor. For example, sensor 132 has causal paths that can be traced back to two distinct sensors (sensor 101 and sensor 102). In order to find the cause(s) of an anomalous sensor 132 the causal path(s) may be followed to efficiently trouble shoot the anomalous node and discover the root cause(s) of the anomalous behavior. In some embodiments, anomalous behavior observed in a sensor can only be traced to the Markov blanket or through the causal paths (e.g., dotted arrows for node 132).

In some embodiments, the weights of the DAG may be relearned based on experimental data or observational data (e.g., metrology data of a manufactured substrate). For example, after a DAG in generated based on sensor values, the weights of the DAG can be updated based on metrology data (e.g., measurements of the manufactured semiconductor products).

After the generation of a DAG, a criticality score for each of the nodes may be calculated, and the nodes may be ranked based on the criticality score. Higher criticality scores may be used to determine which of the nodes are most important to a given system. In some embodiments, the criticality of each node may be calculated through one or more various methodologies. For example, nodes with more connections may be ranked higher than other nodes. The weight of a connection may also be used to provide a measure of criticality. For example, a node with higher weighted connections may be provided a higher criticality score than a node with lower weighted connections. In an embodiment, a weighted anomaly score may be computed for each sensor, and the weighted anomaly score may be used to trigger an alarm to indicate an anomalous sensor. The weighted anomaly score may be a computed value that has contributions from the criticality scores and a severity of a fault metric (e.g., a magnitude of the fault, a time of the fault, etc.). The weighted anomaly scores of anomalous sensors can displayed to an operator of a tool.

In some embodiments, the causal-based criticality values are determined through the causal graph. In an embodiment, criticality values of causally linked sensors from a causal grouping approach (e.g., a Markov blanket approach and/or causal path tracing approach) may be used to calculate the anomaly score of a given node. In some embodiments, only criticality scores corresponding to anomalous nodes in a Markov blanket and/or causal path may be used to calculate the anomaly score of a given node. A Markov blanket approach is described with respect to FIG. 2A, and a causal path tracing approach is described with respect to FIG. 2B.

Figure 2A:
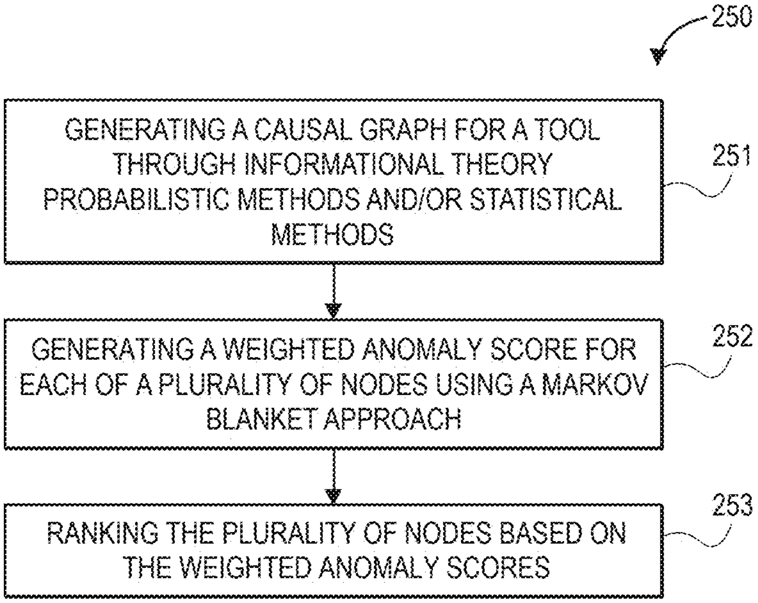
FIG. 2A is a flow diagram of a process for ranking anomalous sensors through the generation of criticality scores based on a Markov blanket approach, in accordance with an embodiment.

Referring now to FIG. 2A, a flow diagram depicting a process 250 for ordering anomalous sensor alarms based on causal-based criticality values is shown, in accordance with an embodiment. For example, the process 250 may be used in order to prevent alarm fatigue. As noted above, this may be used to improve tool value by decreasing downtime for the tool, increasing device yields, and/or the like.

In an embodiment, the process 250 may begin with operation 251, which comprises generating a causal graph. In an embodiment, the nodes in a causal graph may represent the variables of the tool (e.g., the sensors, values measured by sensors, sensor data, etc.), and the edges (represented with arrows) between nodes represent the causal relationships between the nodes (e.g., sensors of a manufacturing system/subsystem, sensor data, sensor values, etc.). In some embodiments, the direction of the arrow indicates the direction of causality, with the tail of the arrow indicating the cause and the head of the arrow indicating the effect.

In an embodiment, any suitable informational theory probabilistic methods and/or statistical methods may be used to determine whether there is a causal relationship between two variables within the causal graph. For example, informational theory probabilistic methods such as Granger causality, transfer entropy measures, cross-entropy measures, partial directed coherence, linear and non-linear conditional independence tests, and/or the like may be used to generate the causal graph. For example, the causal graph may be a DAG or the like. The DAG may be similar to the DAG 100 described in greater detail herein. In an embodiment, a criticality score for each of the nodes may be determined from the casual graph. In a particular embodiment, the causal structure is a weighted causal structure where the causal structure is learned from score and constraint based algorithms, and the edge weights are learned by informational theory probabilistic approach and/or a statistical approach.

In an embodiment, the process 250 may continue with operation 252, which comprises generating a weighted anomaly score for each of a plurality of nodes within the causal graph. In an embodiment, the weighted anomaly scores may be computed values that have contributions from the criticality scores of the nodes within a Markov blanket of a given node and a severity of a fault metric (e.g., a magnitude of the fault, a time of the fault, etc.) for the given node. In some embodiments, the weighted anomaly score for an individual node within the system may be informed by a total number of other nodes within the given Markov blanket for the individual node. Though, any suitable metric (e.g., number of edges, weight of the edges, direction of the edges, etc.) defined by the Markov blanket may be used or any combination of Markov blanket metrics may be used in order to determine the weighted anomaly score for the individual node. In some embodiments, the weighted anomaly score may be more heavily influenced by the criticality score than the fault metric in order to minimize alarm fatigue.

In an embodiment, the process 250 may continue with operation 253, which comprises ranking the nodes based on the weighted anomaly scores. For example, the nodes may be ranked in a table that is generated for an operator. In some embodiments, only nodes that are anomalous (i.e., outside of a predetermined threshold) are displayed to the operator, and the displayed nodes are ranked based on the associated weighted anomaly scores. In this way, the operator can easily identify which of anomalous nodes need immediate attention.

Figure 2B:
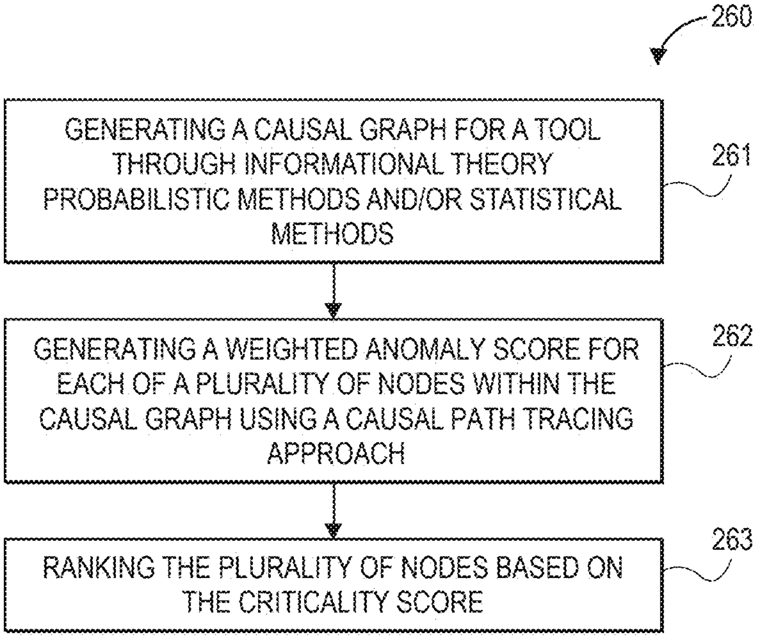
FIG. 2B is a flow diagram of a process for ranking anomalous sensors through the generation of criticality scores based on a causal path tracing approach, in accordance with an embodiment.

Referring now to FIG. 2B, a flow diagram depicting a process 260 for ordering anomalous sensor alarms based on causal-based criticality values is shown, in accordance with an additional embodiment. For example, the process 260 may be used in order to prevent alarm fatigue. As noted above, this may be used to improve tool value by decreasing downtime for the tool, increasing device yields, and/or the like.

In an embodiment, the process 260 may begin with operation 261, which comprises generating a causal graph. In an embodiment, any suitable informational theory probabilistic methods and/or statistical methods may be used to determine whether there is a causal relationship between two variables within the causal graph. In an embodiment, the causal graph may be a DAG or the like. The DAG may be similar to the DAG 100 described in greater detail herein. The causal graph generated in operation 261 may be similar to the causal graph generated in operation 251 described in greater detail herein. In an embodiment, a criticality score for each of the nodes may be determined from the casual graph.

In an embodiment, the process 260 may continue with operation 262, which comprises generating a criticality score for each of a plurality of nodes within the causal graph. In an embodiment, the weighted anomaly scores may be computed values that have contributions from the criticality scores of the nodes within a causal path of a given node and a severity of a fault metric (e.g., a magnitude of the fault, a time of the fault, etc.) for the given node. For example, a causal path may be determined for each of the nodes (e.g., sensors) in the system. In some embodiments, the weighted anomaly score for an individual node within the system may be informed by a total number of other nodes within the causal path for the individual node or a number of causal paths for the individual node. Though, any suitable metric (e.g., number of edges, weight of the edges, direction of the edges, etc.) related to the causal path of the individual node may be used or any combination of causal path metrics may be used in order to determine the weighted anomaly score for the individual node.

In an embodiment, the process 260 may continue with operation 263, which comprises ranking the nodes based on the weighted anomaly score. For example, the nodes may be ranked in a table that is generated for an operator. In some embodiments, only nodes that are anomalous (i.e., outside of a predetermined threshold) are displayed to the operator, and the displayed nodes are ranked based on weighted anomaly score. In this way, the operator can easily identify which of anomalous nodes need immediate attention. In some embodiments, the weighted anomaly score may be more heavily influenced by the criticality score than the fault metric in order to minimize alarm fatigue.

In other embodiments, the weighted anomaly score may be used to scale a threshold used to determine if a node is anomalous. For example, nodes with higher criticality scores may have a stricter threshold than nodes with lower criticality scores. That is, the threshold of nodes with lower criticality scores may be relaxed. In such a threshold scaling process, low criticality score nodes may be omitted from display to the operator until a larger error is determined since the low criticality score nodes have a smaller impact on the process overall. This reduces the presence of false positives for low criticality score sensors while still maintaining a high sensitivity to detect anomalous sensors that have a high criticality score. As such, the overall number of anomalous sensors displayed to the operator is reduced while still allowing for quick identification of potential issues with the tool and/or process. The presentation of fewer alarms based on anomalous sensors reduces alarm fatigue.

Figure 3:
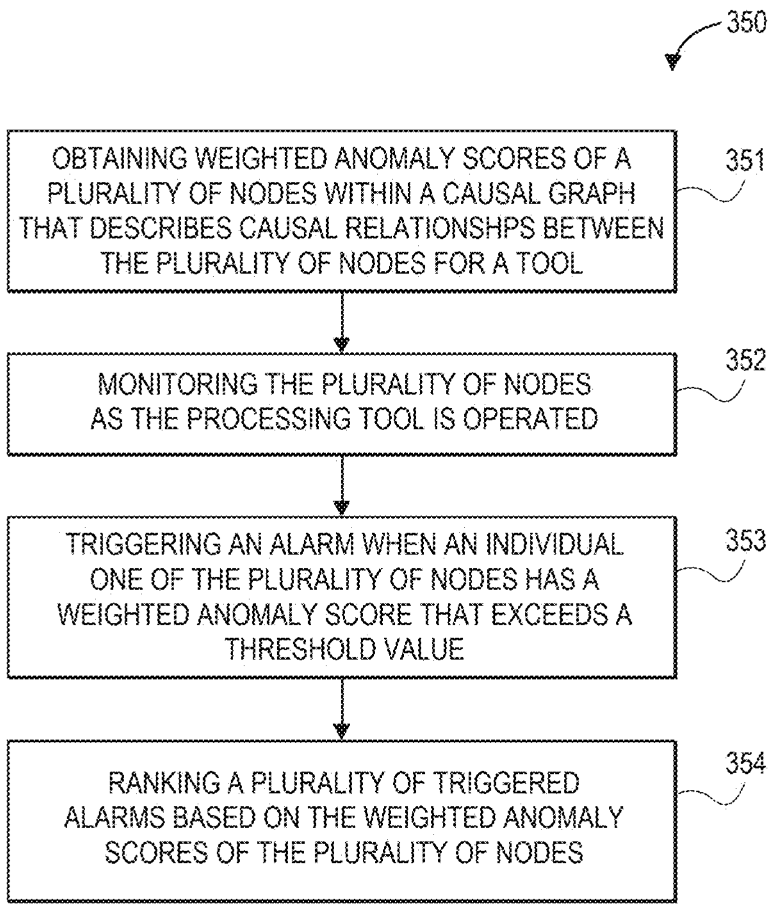
FIG. 3 is a flow diagram of a process for ranking anomalous sensor alarms based on criticality scores of the anomalous sensors, in accordance with an embodiment.

Referring now to FIG. 3, a flow diagram of a process 350 for ranking alarms that provide an indication that a sensor is anomalous is shown, in accordance with an embodiment. In an embodiment, the process 350 may begin with operation 351, which comprises obtaining weighted anomaly scores of a plurality of nodes within a causal graph that describes causal relationships between the plurality of nodes for a processing tool. For example, the nodes may represent sensors that are coupled to the processing tool (e.g., a semiconductor processing tool). In an embodiment, the weighted anomaly scores may be obtained using processes similar to those described herein with respect to FIGS. 2A and 2B. For example, a Markov blanket approach or a causal path tracing approach may be used to calculate the weighted anomaly scores for the plurality of nodes.

In an embodiment, the process 350 may continue with operation 352, which comprises monitoring the plurality of nodes as the processing tool is operated. In an embodiment, the plurality of nodes may be monitored with an FDC algorithm or the like. In an embodiment, the process 350 may continue with operation 353, which comprises triggering an alarm when an individual one of the plurality of nodes has a weighted anomaly score that exceeds a threshold value associated with the individual one of the plurality of nodes. For example, each of the plurality of nodes may have an associated threshold value for the associated weighted anomaly score, and an alarm is triggered when the weighted anomaly score exceeds the threshold value associated with the node. As noted above, the processing tool may include hundreds of nodes (e.g., sensors), and many alarms may be triggered during monitoring. As such, alarm fatigue may be an issue.

In an embodiment, the process 350 may continue with operation 354, which comprises ranking a plurality of triggered alarms based on the weighted anomaly scores of the plurality of nodes. That is, a triggered alarm for a node that has a high criticality score is ranked higher than a triggered alarm for a node that has a low criticality score. This allows for alarms for nodes that have a higher impact on the processing outcomes within the tool to be visually prioritized so that alarm fatigue is avoided.

It is to be appreciated that sensors for the tools described herein may acquire data (i.e., sensor readings) throughout the processing of a single substrate and throughout the processing of a plurality of substrates over time. In this way, the data available to the operator of the tool can be leveraged to monitor the tool over time. In some embodiments, such data may be used by one or more processes for root cause analysis in order to predict when a high criticality sensor will exceed a threshold and become anomalous. In this way, the presence of an anomalous high criticality sensor may be prevented.

Generally, the behavior of sensors over time can be monitored in order to determine if a low criticality score upstream sensor turning anomalous will subsequently drive a causally related high criticality score downstream sensor to be anomalous. When such a relationship is determined, the criticality score of the low criticality score upstream sensor may be increased (or a threshold of the sensor may be narrowed) in order to provide an earlier warning of potential issues with a tool. An example of such a process is described with respect to FIG. 4.

Figure 4:
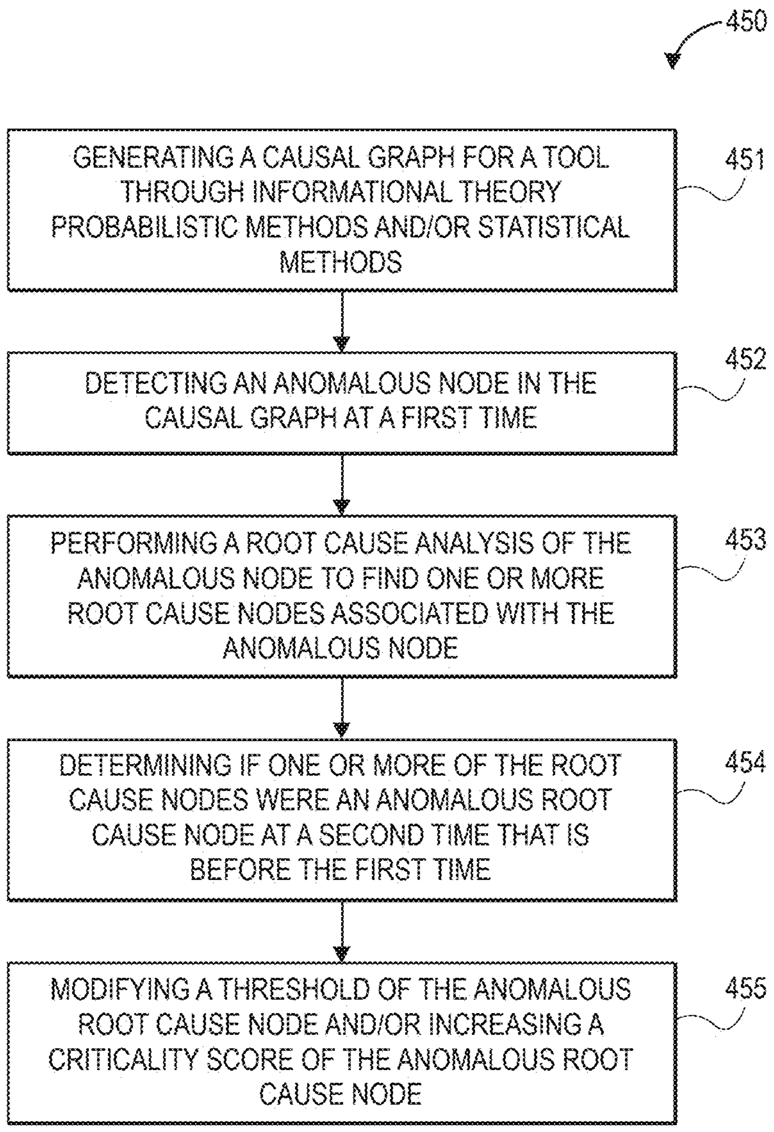
FIG. 4 is a flow diagram of a process for implementing a root cause analysis in order to modify criticality scores of nodes in order to provide predictions of anomalous behavior in high criticality score nodes, in accordance with an embodiment.

Referring now to FIG. 4, a process 450 for modifying a criticality score and/or threshold for a node (e.g., sensor) of a tool (e.g., a semiconductor processing tool such as any of those described in greater detail herein) is shown, in accordance with an embodiment. In an embodiment, the process 450 may begin with operation 451, which comprises generating a causal graph for a tool through informational theory probabilistic methods and/or statistical methods. In an embodiment, the causal graph may be generated with processes similar to any of those described in greater detail herein. In an embodiment, the causal graph may be a DAG or the like.

In an embodiment, the process 450 may continue with operation 452, which may include detecting an anomalous node in the causal graph at a first time. In an embodiment, the anomalous node (e.g., anomalous sensor) may be a node that has a high criticality score relative to other nodes in the causal graph. A sensor turning anomalous may refer to the weighted anomaly score of the sensor exceeding a predetermined threshold. The weighted anomaly score may be calculated with any suitable causal grouping approach, such as a Markov blanket approach, a causal path tracing approach, or the like, similar to any of the embodiments described in greater detail herein. As such, the transition to an anomalous state may significantly impact processing in the tool.

In an embodiment, the process 450 may continue with operation 453, which comprises performing a root cause analysis of the anomalous node to find one or more root cause nodes associated with the anomalous node. In an embodiment, the root cause analysis may be similar to the root cause analysis process described above with respect to FIG. 1. For example, the causes of the anomalous sensor may be traced using the causal relationships between the anomalous node and other nodes in the system using the causal graph. In order to find the cause(s) of an anomalous sensor the causal path(s) may be followed to efficiently trouble shoot the anomalous node and discover the root cause(s) of the anomalous behavior. In some embodiments, anomalous behavior observed in a sensor may be traced to the Markov blanket of the anomalous node or through the causal paths of the anomalous node.

In an embodiment, the process 450 may continue with operation 454, which comprises determining if one or more of the root cause nodes were an anomalous root cause node at a second time that is before the first time. This operation may be useful to track a cascading series of anomalous readings through the tool. For example, the anomalous root cause node may be an early indicator of the potential problems in the anomalous node. However, when the anomalous root cause node has a low criticality score, the transition to an anomalous node may go unnoticed when a ranking process is used to highlight certain anomalous nodes. That is, the transition of a low criticality node to an anomalous node may not significantly impact the processing in the tool, but that transition may be an early indicator that a causally related node with a high criticality score may transition to being an anomalous node in the near future.

In some embodiments, a history of the data compiled for each of the root cause nodes may be analyzed to see if there were any anomalous readings during a lookback period before the first time. In some embodiments, the lookback period may be up to 1 minute before the first time, up to 5 minutes before the first time, up to 30 minutes before the first time, up to an hour before the first time, or up to a day before the first time. Though, longer lookback periods may be used in some embodiments. Embodiments may also look at historical data of the tool in order to see if the transition to an anomalous root cause node consistently predicts the transition of the high criticality score anomalous node.

In an embodiment, the process 450 may continue with operation 455, which comprises modifying a threshold of the anomalous root cause node and/or increasing a criticality score of the anomalous root cause node. For example, a weighting applied to the criticality score and/or the fault magnitude in a calculation used for determining a weighted anomaly score may be modified. The modification of the threshold and/or increase in the criticality score allows for the transition to an anomalous state to be flagged as more important so that an operator is made aware of the potential issue earlier. For example, decreasing the threshold may allow for the anomalous behavior to be more pronounced so that the alarm is more severe. Increasing the criticality score (above what the causal graph modeling would generally assign to the node) allows for an override of the importance of the node since it has been determined to be a leading indicator of subsequent issues to a more important node downstream with a higher criticality score.

The change to the threshold and/or the criticality score may also be associated with the difference between the first time and the second time. For example, if the difference between the first time and the second time is large (e.g., an hour or more), the scaling may be lower than if the difference between the first time and the second is small (e.g., under an hour). The scaling may change over time after an alarm for the anomalous root cause node is made. For example, the ranking of the alarm may be increased over time (as the expected transition of the high criticality score node to an anomalous state approaches) by periodically shrinking the threshold and/or increasing the criticality score of the anomalous root cause node.

Accordingly, the system allows for leading indicators that can be used to perform preventative maintenance, control of the processing conditions, and/or the like in order to improve processing outcomes (e.g., yield), reduce tool downtime, and/or the like.

Figure 5:
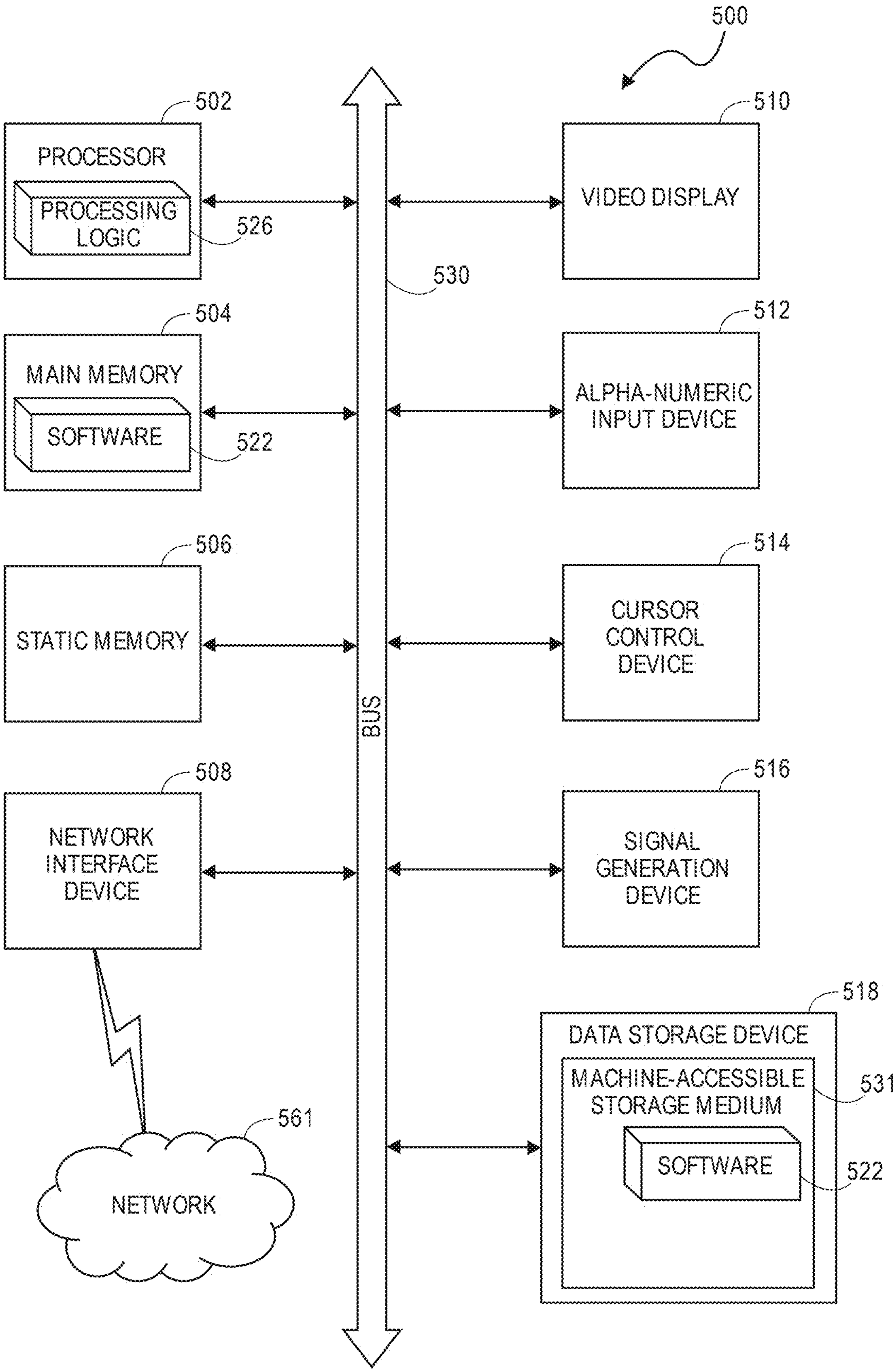
FIG. 5 illustrates a block diagram of an exemplary computer system of a processing tool, in accordance with an embodiment of the present disclosure.

Referring now to FIG. 5, a block diagram of an exemplary computer system 500 of a processing tool is illustrated in accordance with an embodiment. In an embodiment, computer system 500 is coupled to and controls processing in the processing tool. The computer system 500 may be communicatively coupled to one or more vapor concentration sensor modules, such as those disclosed herein. The computer system 500 may utilize outputs from the one or more vapor concentration sensor modules in order to modify one or more parameters, such as, for example, processing recipe parameters, cleaning schedules for the processing tool, component replacement determinations, and the like.

Computer system 500 may be connected (e.g., networked) to other machines in a Local Area Network (LAN), ECAT, an intranet, an extranet, or the Internet. Computer system 500 may operate in the capacity of a server or a client machine in a client-server network environment, or as a peer machine in a peer-to-peer (or distributed) network environment. Computer system 500 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 500, the term "machine" shall also be taken to include any collection of machines (e.g., computers) that individually or jointly execute a set (or multiple sets) of instructions to perform any one or more of the methodologies described herein.

Computer system 500 may include a computer program product, or software 522, having a non-transitory machine-readable medium having stored thereon instructions, which may be used to program computer system 500 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 500 includes a system processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device, cloud storage), which communicate with each other via a bus 530.

System processor 502 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 502 may also be one or more special-purpose processing devices such as an application specific integrated circuit (ASIC), a field programmable gate array (FPGA), a digital signal processor (DSP) system, network system processor, or the like. System processor 502 is configured to execute the processing logic 526 for performing the operations described herein.

The computer system 500 may further include a system network interface device 508 for communicating with other devices or machines. The computer system 500 may also include a video display unit 510 (e.g., a liquid crystal display (LCD), a light emitting diode display (LED), or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-accessible storage medium 531 (or more specifically a computer-readable storage medium) on which is stored one or more sets of instructions (e.g., software 522) embodying any one or more of the methodologies or functions described herein. The software 522 may also reside, completely or at least partially, within the main memory 504 and/or within the system processor 502 during execution thereof by the computer system 500, the main memory 504 and the system processor 502 also constituting machine-readable storage media. The software 522 may further be transmitted or received over a network 561 via the system network interface device 508. In an embodiment, the network interface device 508 may operate using RF coupling, optical coupling, acoustic coupling, or inductive coupling.

While the machine-accessible storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

The above description of illustrated implementations of embodiments of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

What is claimed is:

1. A method, comprising:

generating a weighted causal graph for a tool through an informational theory probabilistic approach and/or a statistical approach;

generating a criticality score for each of a plurality of nodes within the weighted causal graph;

generating a weighted anomaly score for each of the plurality of nodes, wherein the weighted anomaly score is calculated based on the criticality score of one or more nodes within a causal group for a given node and a fault metric of the given node; and ranking the plurality of nodes based on the weighted anomaly score of each of the plurality of nodes.

2. The method of claim 1, wherein the weighted causal graph is a directed acyclic graph (DAG).

3. The method of claim 1, wherein the plurality of nodes are each associated with a different sensor of the tool, and wherein the tool is configured to be used to manufacture semiconductor devices.

4. The method of claim 1, wherein the ranked plurality of nodes are displayed on a video display unit with a visual indicator.

5. The method of claim 1, wherein the informational theory probabilistic approach and/or the statistical approach comprises one or more of Granger causality, transfer entropy measures, cross-entropy measures, partial directed coherence, a linear conditional independence test, or a non-linear conditional independence test.

6. The method of claim 1, wherein the plurality of nodes are monitored with a fault detection and classification (FDC) algorithm in order trigger one or more alarms when one or more of the plurality of nodes transition into an anomalous node.

7. The method of claim 6, wherein the weighted anomaly score is used to rank the one or more alarms.

8. The method of claim 1, wherein the causal group is obtained with a Markov blanket approach.

9. The method of claim 8, wherein the Markov blanket approach comprises:

determining a Markov blanket for each of the plurality of nodes;

generating the weighted anomaly score based on one or more of a number of nodes in the Markov blanket of each of the plurality nodes, a number of edges in the Markov blanket of each of the plurality of nodes, a weight of the edges in the Markov blanket of each of the plurality of nodes, or a direction of the edges in the Markov blanket of each of the plurality of nodes.

10. The method of claim 1, wherein the causal group is obtained with a causal path tracing approach.

11. The method of claim 10, wherein the causal path tracing approach comprises:

determining a causal path for each of the plurality of nodes;

generating the weighted anomaly score based on one or more of a number of nodes in the causal path of each of the plurality nodes, a weight of edges in the causal path of each of the plurality of nodes, a direction of the edges in the causal path of each of the plurality of nodes, a number of causal paths for each of the plurality of nodes.

12. A method, comprising:

obtaining criticality scores of a plurality of nodes within a causal graph, wherein the causal graph describes causal relationships between the plurality of nodes for a processing tool;

monitoring the plurality of nodes as the processing tool is operated;

triggering an alarm when an individual one of the plurality of nodes has a weighted anomaly score that exceeds a threshold value associated with the individual one of the plurality of nodes, wherein the weighted anomaly score is calculated based on a combination of an associated criticality score and a fault severity; and ranking a plurality of triggered alarms based on the weighted anomaly scores of the plurality of nodes.

13. The method of claim 12, wherein the plurality of nodes are monitored with a fault detection and classification (FDC) algorithm.

14. The method of claim 12, wherein the weighted anomaly scores are obtained with a Markov blanket process.

15. The method of claim 12, wherein the weighted anomaly scores are obtained with a causal path tracing approach.

16. The method of claim 12, wherein each of the plurality of nodes are correlated to a different one of a plurality of sensors coupled to the processing tool.

17. A method, comprising:

detecting an anomalous node in a causal graph of a tool at a first time;

performing a root cause analysis of the anomalous node to find a root cause node associated with the anomalous node;

determining if the root cause node was an anomalous root cause node at a second time that is before the first time; and modifying a threshold of the anomalous root cause node and/or increasing a criticality score of the anomalous root cause node.

18. The method of claim 17, wherein the root cause analysis uses a Markov blanket approach or a causal path tracing approach.

19. The method of claim 17, wherein the second time is within a lookback period that is up to 1 day before the first time.

20. The method of claim 17, wherein modifying the threshold of the anomalous root cause node and/or increasing the criticality score of the anomalous root cause node is scaled over time after the anomalous root cause node transitions to an anomalous state.

* * * * *